Aug. 21, 1956 P. NARBUTOVSKIH 2,759,987
COOLING ELECTRICAL APPARATUS
Filed April 12, 1952 3 Sheets-Sheet 1

Fig. 1.

WITNESSES:
John E. Hensley
K. W. Thomas

INVENTOR
Paul Narbutovskih.
BY
Ezra D. Savage
ATTORNEY

Aug. 21, 1956

P. NARBUTOVSKIH 2,759,987

COOLING ELECTRICAL APPARATUS

Filed April 12, 1952

INVENTOR
Paul Narbutovskih.
BY
Ezra W. Savage
ATTORNEY

United States Patent Office 2,759,987
Patented Aug. 21, 1956

2,759,987

COOLING ELECTRICAL APPARATUS

Paul Narbutovskih, Sharpsville, Pa., assignor to Westinghouse Electric Corporation, East Pittsburgh, Pa., a corporation of Pennsylvania Application April 12, 1952, Serial No. 281,970

10 Claims. (Cl. 174—15)

This invention relates to electrical apparatus, and particularly to apparatus utilizing a vapor dielectric atmosphere for dissipating heat developed during operation of the apparatus and as the insulating medium for the apparatus.

This application is a continuation-in-part of application Serial No. 228,466, filed May 26, 1951, by Paul Narbutovskih, and assigned to the same assignee as this application.

It is well known in the electrical industry to insulate enclosed electrical apparatus with a liquid dielectric by immersing the operating electrical elements therein for the purpose of cooling the electrical elements and for electrically insulating the elements from one another and from the casing in which they are disposed. However, in such electrical aparatus large quantities of liquid dielectric, such as oil or a chlorinated diphenyl or the like, are required for the insulation and cooling of the apparatus. Thus, for example, in transformers having a 1000 kva. rating approximately 500 gallons of liquid dielectric are normally used.

Where such liquid dielectrics are employed, it is found that they may sludge or deteriorate by a reaction with moisture, oxygen or other reactive gas that may be present in the transformer and that the dielectric thereby suffers a deterioration or degradation of its insulating characteristics. Further, there is danger of an explosion or fire where mineral oil is utilized as the liquid dielectric or where a chlorinated dielectric liquid is employed such corrosive and harmful halogen fumes may be evolved which will corrode the interior of the tank and the apparatus.

Recently there has been developed the dry-type, gas-filled or air-cooled transformer which avoids some of the disadvantages of the liquid dielectric-filled equipment. Such a dry-type transformer, however, has the disadvantage in that adequate means must be provided for securing an adequate flow of air or other gas throughout the windings in order to secure sufficient cooling of the electrical apparatus. Further, such transformers must be provided with solid insulation which of necessity must be much heavier than with the liquid dielectric apparatus. Further, it has been found that the dry-type transformer has very little overload capacity as contrasted to the liquid dielectric apparatus. In addition, dry-type transformers, particularly of the totally sealed type, are physically large for a given rating. Furthermore, there are practical maximum limits in the capacity and voltage ratings of the dry-type transformers.

There has also been developed recently a method of cooling a transformer by the vaporization of a liquid coolant. By utilizing such a method the fire and explosion-proofness of a dry-type transformer as well as the small physical size of a liquid immersed transformer is obtained. Likewise, at present there is no foreseeable limit as to the maximum rating that can be obtained from a transformer that utilizes the vaporization of a liquid coolant for cooling the transformer.

When the liquid coolant vaporizes, it acts as an insulator for the transformer about which the vapor is disposed. The dielectric strength of the vapor depends on the pressure of the vapor, and hence upon the temperature of the windings and other associated apparatus of the transformer. Under normal variations of the load on the transformer and ambient temperature, a large variation of the temperature of the transformer occurs when no means are provided for controlling the rate of dissipation of heat by the transformer cooling surfaces. Because of this temperature variation, the dielectric strength of the vaporous insulation varies within a large range with the variation of the load. Thus, when no such control means is provided, the transformer is unable to utilize to the full extent the good dielectric properties of the vapors when it is operating in the lower temperature range.

An object of this invention is to provide, in an enclosed electrical apparatus depending on fire and explosion-proof gases for its insulation and relying upon vaporization of a liquid coolant to dissipate heat developed in use, for retarding the dissipation of heat from the vaporized coolant through the casing walls until a predetermined pressure is developed within the casing and to thereafter progressively increase the dissipation of heat through the casing walls as the pressure tends to increase to thereby automatically maintain the pressure and temperature within the casing within predetermined values.

Another object of this invention is to provide, in an enclosed electrical apparatus having an inert non-condensable gas therein and a vaporizable liquid coolant for dissipating heat therefrom by vaporization of the liquid coolant, for so insulating the side walls of the casing while the pressure of the vaporized coolant is below a predetermined value as to retard dissipation of heat from the vapors through the side walls, and to accelerate the dissipation of heat from the vapor through the side walls when the pressure of the vaporized coolant is above the predetermined value.

Other objects of this invention will become apparent from the following description when taken in conjunction with the accompanying drawing, in which:

Figure 1:
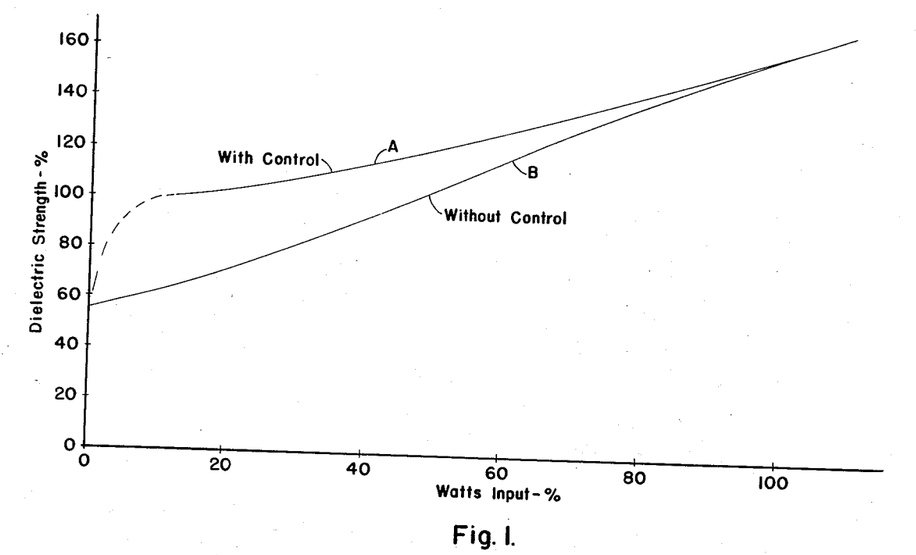
Figure 1 is a graph illustrating the dielectric strength of the vapors within the transformer for variations in watts input to the transformer when this invention is utilized and when it is not utilized.

Referring to Fig. 1, a graph comprising curves A and B represents an example of how the dielectric strength of the vapors within a transformer, cooled by vaporization of a liquid coolant, varies with the watts input to the transformer for a fixed ambient temperature when this invention is and when it is not, respectively, incorporated into the transformer. As can be seen from Fig. 1, when this invention is incorporated into the transformer, the dielectric strength of the vapors at lower power inputs to the transformer is much greater than when no means are provided for controlling the dissipation of heat through the transformer case. Referring to curve A, 100% dielectric strength for the transformer can be obtained when there is approximately 12% power input to the transformer. In contrast, when this same per cent power input is applied to a transformer with no means of controlling the rate of dissipation of heat through the transformer case only 62% dielectric strength for the vapors within the transformer case is obtained. This is more clearly illustrated by curve B of Fig. 1. Thus, at lower power inputs to a transformer having no such control means, the transformer has to be provided with additional insulation in order to prevent damage thereto. The additional insulation increases the overall size of the transformer as well as its original cost of manufacture.

Figure 2:
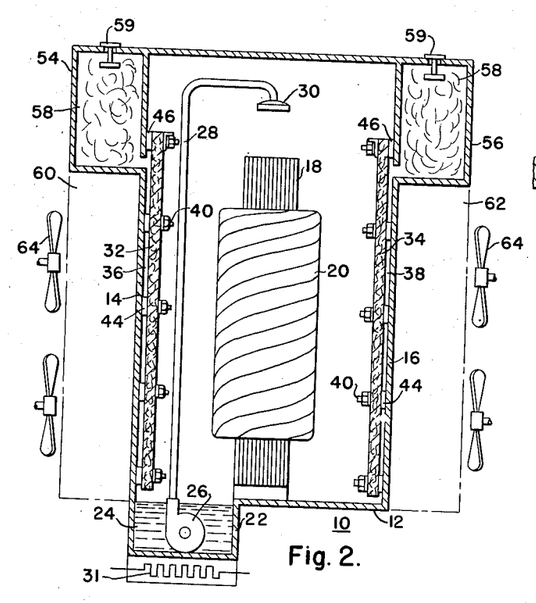
Fig. 2 is a diagrammatic view of a transformer constructed in accordance with this invention.

Referring to Fig. 2, this invention is illustrated by reference to a transformer 10 comprising a sealed casing 12 having side walls 14 and 16 within which is disposed a magnetic core 18 and electrical windings 20 associated therewith disposed to seat on the base of the case. For the purpose of simplifying the drawing, the leads to the windings 20 and the bushings normally carried by the top or cover of the casing 12 are not shown.

As illustrated, the bottom of the casing 12 is provided with a sump 22 in which there is disposed a supply 24 of vaporizable liquid coolant. The supply 24 of liquid coolant is relatively small as compared to the size of the casing 12 being normally only in the sump 22 out of contact with the core 18 and electrical windings 20.

Different vaporizable liquid coolants are known to those skilled in the art and can be employed in practicing this invention. In practice, it is preferred to utilize the vaporizable liquid coolants disclosed in U. S. Patent 2,561,738 of Charles F. Hill, which is assigned to the assignee of this invention.

As disclosed in the Hill Patent 2,561,738, the vaporizable liquid coolant may comprise the liquid fluorinated organic compounds selected from the group consisting of hydrocarbons, hydrocarbon ethers and tertiary hydrocarbon amines in which at least half the hydrogen atoms have been substituted by at least one halogen selected from the group consisting of chlorine and fluorine, and of which at least half of the halogen is fluorine. The hydrocarbons and the hydrocarbon groups attached to oxygen or nitrogen atoms may be aliphatic, aromatic, cycloaliphatic and alkaryl. Liquid perfluorocarbons, perfluorocarbon ethers and perfluorocarbon tertiary amines boiling between 50° C. and 225° C. have outstanding properties. Perhalocarbon compounds composed of only carbon and a halogen selected from at least one of the group consisting of chlorine and fluorine, of which fluorine comprises at least half the halogen atoms are excellent liquid coolants for the purpose of this invention.

The vapors of the fluorinated organic compound referred to hereinbefore have outstanding electrical insulating properties. They are superior to practically all other gases in such electrical insulating characteristics as breakdown strength, dielectric strength, power factor and resistance to formation of corona under similar conditions of temperature and pressure. These compounds are outstanding in their stability to chemical and thermal breakdown being surpassed only by the permanent gases. The fluorinated compounds in the liquid state exert negligible, if any, solvent or deteriorating action on ordinary insulating materials and varnishes employed in the preparation of conventional electrical elements such as windings, cores and coils.

As examples of specific fluorinated organic compounds which may be utilized in practicing this invention either alone or in mixtures, reference may be had to the following list of fluorinated organic compounds:

| | Boiling point, ° C. |
|---|---|
| Perfluorophenanthrane | 205 |
| Perfluorodibutyl ether | 100 |
| Perfluorotriethyl amine | 71 |
| Perfluorotributyl amine | 178 |
| Perfluorodimethylcyclohexane | 101 |
| Perfluoromethylcyclohexane | 76 |
| Perfluoro-n-heptane | 82 |
| Perfluorotoluene | 102 |
| Perfluorocyclic ether ($C_8F_{16}O$) | 101 |
| Perfluorocyclic ether ($C_6F_{12}O$) | 52 |
| Monochlorotetrafluoro-(trifluoromethyl)benzene | 137 |
| Dichlorotrifluoro-(trifluoromethyl)benzene | 170 |
| Trichlorodifluoro-(trifluoromethyl)benzene | 207 |
| Monochloropentadecafluoroheptane | 96 |
| 2-chloro-1,4-bis(trifluoromethyl)benzene | 148 |
| 2-chlorotrifluoromethylbenzene | 150 |
| Perfluorodiethylcyclohexane | 148 |
| Perfluoroethylcyclohexane | 101 |
| Perfluoropropylcyclohexane | 123 |
| Chlorononafluorobis(trifluoromethyl)cyclohexane | 129 |
| Perfluoronaphthalane | 140 |
| Perfluoro-1-methylnaphthalane | 161 |
| Perfluorodimethylnaphthalanes | 177 to 179 |
| Perfluoroindane | 116 to 117 |
| Perfluorofluorane | 190 |
| Perfluorobicyclo-(2.2.1)heptane | 70 (746 mm.) |

The amines and ethers may have dissimilar halogen substituted hydrocarbon groups present as, for example, 2,2-dichloro-1,1,1,-trifluoroethyl-perfluorobutyl ether and perfluorodibutylethyl amine. The freezing points of the above-listed liquid compounds are below zero degrees centigrade, many below being below −50° C. so that they can be safely employed, individually or in mixtures, under nearly all ambient conditions to be expected in service.

In order to apply the liquid coolant 24 to the electrical windings 20, a pump 26 is disposed for operation to withdraw the liquid coolant 24 from the sump 22, the pump 26 being connected as by a conduit 28 to a spray or a flow device 30 from which the liquid coolant is distributed over the core 18 and windings 20. The liquid coolant when thus delivered distributes itself as a thin film or stream (not shown) over the electrical elements and is caused to evaporate freely if the electrical components are hot, thereby cooling the core 18 and the electrical windings 20.

As can be seen from Fig. 1, this invention provides an extended lower range of power input into the transformer at which a normal dielectric strength of the vapor insulation will be maintained. Thus, when utilizing this invention, it is possible to maintain 100% dielectric strength of the vapor insulation for the full normal range of variation of the load and the ambient temperature. This is particularly true of the medium and large size power transformer units in which a relatively greater amount of the external cooling surface can be controlled as described herein, this surface being largely in the form of externally mounted coolers. In smaller transformer units, however, the external tank cooling surface which lends itself to any of the arrangements described herein is inherently small. Correspondingly, the range of load over which the 100% insulating value of the vapors can be maintained is smaller, and in some cases may not be sufficient to cover the full normal range of load variation. In these cases, to supplement the heat input deficiency at low loads, an auxiliary heater 31 may be provided to maintain the temperature of the system at the proper level. The same heater 31 may be used at the time the transformer unit is first put into operation to raise the transformer temperature to the minimum operating value prior to energization should this minimum required temperature, as determined by the insulation design, be greater than the ambient. In the absence of any load on the transformer, if this invention is not incorporated, the auxiliary heater required to raise the temperature enough to give 100% insulation strength must deliver 47% of the full load losses in the transformer. When this invention is incorporated, however, the required heater rating is only about 12% of the full load losses in the transformer, as represented by the particular case shown on Fig. 1. The curves of Fig. 1 represent data obtained on a small transformer tank without externally mounted coolers. On larger transformers, the effect of incorporating this invention will show even more favorably.

In order to retard the dissipation of heat from the vapors within the casing 12 through the side walls 14 and 16 under normal or slight load operating conditions for the transformer, liners 32 and 34 are applied to the inner surface of the side walls 14 and 16, respectively, to preferably substantially cover the side walls. The liners 32 and 34 are mounted within the casing in such a manner as to cooperate with the side walls 14 and 16, respectively, to provide a substantially uniform space 36 and 38, respectively, along the side wall 14 and the side wall 16, respectively.

Figure 4:
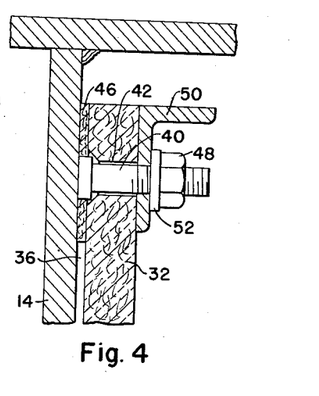
Figs. 4 and 5 are enlarged sectional views of portions of the case structure of Fig. 2.
Figure 5:
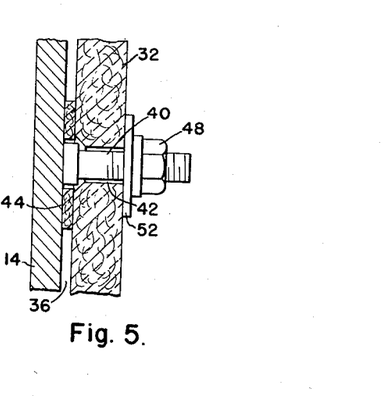

As illustrated more clearly in Figs. 4 and 5 of the drawing, the liner 32 is disposed to be mounted on a plurality of threaded studs 40 which are substantially evenly distributed in spaced relation to one another over the inner surface of the side wall 14. These studs 40 are secured to the side wall 14 in any suitable manner such as by welding them in the selected position. The liner 32, in turn, is provided with a plurality of openings 42 so spaced and distributed throughout the liner 32 for receiving the studs 40 when the liner 32 is applied to the side wall 14.

In order to provide the space 36 between the liner 32 and the side wall 14, a plurality of washers 44 and a strip 46 having a predetermined thickness and which are formed of fibrous and stable material such as asbestos are disposed about the base of studs 40 for receiving the liner 32 in seating engagement thereon. A strip 46 is disposed along the upper edge, as well as the sides, of the liner 32 so that when the nuts 48 are tightened against member 50, the upper edge and the sides of the liner 32 are pressed into tight engagement with the strips 46 to effect a seal along the upper edge and the vertical sides of the liner 32 with the side wall 14. Likewise, washers 52 are disposed for receiving the nuts 48 and aid in tightly holding the liner 32 in seating engagement with the spacing washers 44 to thereby insure that the liner 32 is spaced a uniform distance from the side wall 14.

As illustrated in the embodiment of Fig. 2, the lower end of each of the spaces 36 and 38 remains open in communication with the vapor space within the casing 12. It will, of course, be appreciated that the liners 32 and 34 are of a size to preferably extend throughout the width of the side walls 14 and 16, and their side edges are sealed in a manner similar to the upper edge of each of the liners 32 and 34.

In order to control the rate of dissipation of heat of the vapors through the side walls 14 and 16, auxiliary chambers 54 and 56 are disposed along the outer upper edge of the side walls 14 and 16, respectively, the lower edge of the auxiliary chambers 54 and 56 being in direct communication with the spaces 36 and 38, respectively. As an alternative arrangement, the auxiliary chambers 54 and 56 may be constructed as separate tanks thermally separated from the casing 12 and in direct communication with the spaces 36 and 38, respectively. These auxiliary chambers 54 and 56 and the associated spaces 36 and 38, respectively, are provided for holding a supply of relatively inert non-condensable gas 58, such as nitrogen. Since the non-condensable gas 58 is of light weight as compared to vapors of the liquid coolant evolved within the casing 12, the nitrogen is normally disposed to be retained within the auxiliary chambers 54 and 56 and their associated spaces 36 and 38, respectively, along the side walls 14 and 16, respectively, when vapors of the liquid coolant are contained within the casing 12.

When first placing the transformer 10 in operation, the noncondensable gas 58 under atmospheric pressure fills the casing 12 and the chambers 54 and 56. Once the transformer 10 is energized, provided insulating clearances in the transformer are such as to operate under ambient temperature conditions, the vaporization of the liquid coolant 24 commences and the movement of the mixture of noncondensable gas and vaporized coolant begins, thus carrying the nitrogen into the spaces 36 and 38 and into the chambers 54 and 56. Since at the beginning of such an operation the noncondensable gas 58 is present in excess of the required volume, the excess of the noncondensable gas 58 is allowed to escape through out-breathing valves 59 disposed in the chambers 54 and 56, respectively. The valves 59 are adjusted to permit out-breathing at a predetermined pressure, and they will automatically provide for the proper amount of noncondensable gas 58 within the system. It is to be understood that the proper conditioning of the system in regard to the required amount of the noncondensable gas 58 may be accomplished by means of hand-operated valves in place of the out-breathing valves 59.

In practice, the noncondensable gas 58 need not be confined to the chambers 54 and 56, but rather may be dispersed through the volume of the casing 12 which may happen under low-load or no-load conditions. As the vaporization of the liquid coolant 24 commences on the transformer windings 20, the vaporized coolant mixes with the noncondensable gas 58 in the casing 12 and the mixture will be continuously displaced into the spaces 36 and 38. In the spaces 36 and 38 the vapor constituent of the mixture condenses, while the noncondensable gas continues accumulating in the chambers 54 and 56. The process is continuous and takes place as long as any noncondensable gas remains in the main portion of the casing 12. If the load is sufficient, none of the noncondensable gas 58 is returned to the main portion of the interior of the casing 12 under these conditions. At the same time, as long as any of the noncondensable gas 58 remains in the upper portion of the interior of the casing 12, it will be continuously mixing with the condensable vapor by the process of diffusion, gradually finding its way into the spaces 36 and 38. Eventually due to the unilateral flow of the noncondensable gas 58 into the spaces 36 and 38, all of the noncondensable gas will be purged out of the main portion of the interior of the casing 12 into the chambers 54 and 56 and also into the spaces 36 and 38. In practice this purging process takes place quite rapidly so that the system is automatically in a correct operating balance at all times.

In practice, sufficient nitrogen is introduced into the auxiliary chambers 54 and 56 so that for operation of the transformer under the specified minimum load conditions, the nitrogen will just fill the auxiliary chambers 54 and 56 and the associated spaces 36 and 38, the pressure of the vapors of the liquid coolant within the casing 12 under such operating conditions being just sufficient to maintain the nitrogen so that it will not escape from the spaces 36 and 38 into the casing 12. Under such minimum load operating conditions, the surface of the end walls and cover of the casing 12 are of sufficient area to effectively cool the vapors of the liquid hydrocarbons evolved within the casing 12 to dissipate sufficient heat therefrom to maintain a given pressure and temperature within the casing 12. The side walls, on the other hand, being effectively covered by the heat insulating liners 32 and 34, do not serve as effective cooling surfaces under such minimum load conditions.

As the load on the transformer increases with an accompanying increase in temperature of the windings 20, the pressure of the vapors of the liquid coolant evolved increases to effect a compression of the nitrogen in the spaces 36 and 38, whereby the vapors of the liquid coolant flow into the spaces 36 and 38 and come into direct contact with the side walls 14 and 16 and the heat of the vapors is dissipated through such side walls. As the pressure tends to increase within the casing 12, the nitrogen in the spaces 36 and 38 become more and more compressed whereby the vapors engage progressively larger areas of the side walls 14 and 16 to effect a progressive automatic increase in the rate of dissipation of heat through the side walls 14 and 16.

In practice it is found that with the spaces provided between the liners and the side walls properly designed, the boundary line between the vapors of the liquid coolant and the nitrogen gas for all loads on the transformer ranging from the minimum to the maximum will range from the bottom of the space to the upper edge of the space where the space is in direct communication with the auxiliary chambers 54 and 56. Thus, for maximum load conditions, the amount of heat loss which the side walls can dissipate will include the full capacity of the space between the liner and side walls and for intermediate loads the vapor-gas boundary line will automatically find its proper position vertically within the spaces so that the heat dissipated through the side walls 14 and 16 of the casing 12 will always equal the heat loss in the transformer.

In practice, it is found that the flow of heat under minimum load conditions through the side walls 14 and 16 will be quite low because the heat flow path through such side walls will include the liners 32 and 34, respectively, the spaces 36 and 38, respectively, filled with noncondensable gas and the external surface film of the side walls 14 and 16, respectively. Under such minimum load conditions, it is estimated that an approximate value of the over-all surface heat transfer coefficient for such an insulated wall will be about $$h = .0013 \frac{\text{watts}}{\text{sq. in. °C.}}$$

where the liner 32 or 34 has a one-half inch thickness and the gas space 36 or 38 is of 1/8" thickness.

However, as the load increases so that the vapors of the liquid coolant compress the nitrogen in the spaces 36 and 38 into the auxiliary chambers 54 and 56 as described hereinbefore and the vapors are in direct contact with the side walls 14 and 16, then the heat transfer from the vapor to and through the side walls 14 and 16 is excellent, it being found that the only practical resistance to the heat flow under such conditions will be the external air film over the surface of the side walls 14 and 16. Under such conditions of operation, for a plain external wall surface, it is found that the over-all surface heat transfer coefficient under self-cooled conditions in air will have a value approximately $$h = .008 \frac{\text{watts}}{\text{sq. in. °C.}}$$

or about six times as great as the value when the transformer is operating under minimum load conditions.

Different materials may be employed as the liners 32 or 34, for instance, an aluminum sheet, a member formed of aluminum sheet having a backing of glass wool, sheet steel, or a sheet of suitable heat insulating material. Aluminum sheet is preferred because of its low radiant heat emissivity, but even ordinary steel forms an effective heat insulating barrier. The liners 32 or 34 need not possess a high mechanical strength since any pressure developed within the casing 12 will be supported by the main casing wall. The only difference in pressure which might be obtained on the two sides of the liner is that caused only by the flow of vapor into the space 36 or 38, such difference in pressure being very slight.

Where it is desired to accelerate the cooling or rate of dissipation of heat from the side walls 14 and 16, banks 60 and 62 of fins, represented in dotted outline, may be suitably attached or secured to the side walls 14 and 16, respectively, and fans 64 may be associated therewith for accelerating the cooling rate. It will, of course, be appreciated that where such fins or forced cooling as by means of the fans 64 are utilized, the ratio between the minimum and maximum rates of heat dissipation will be considerably greater than where the casing 12 is employed without such auxiliary cooling devices.

Figure 3:
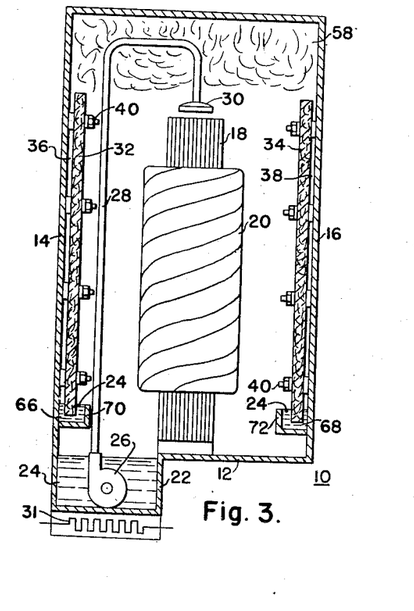
Fig. 3 is a diagrammatic view of the transformer illustrating another embodiment of this invention.

In another embodiment of this invention, as illustrated in Fig. 3, the same numerals are employed for identifying like parts of the embodiment of Fig. 2. In the embodiment of Fig. 3, however, there is no necessity to utilize the auxiliary chambers 54 and 56 at the upper end of the casing 12. Instead the upper end of the casing 12 is utilized as the chamber in the embodiment of Fig. 3 for retaining the supply of inert noncondensable gas 58.

In the embodiment of Fig. 3, the liners 32 and 34 are spaced from the side walls 14 and 16, respectively, as described with reference to the embodiment of Fig. 2, the difference being, however, that the upper end of the liners 32 and 34, respectively, are open to the casing spaces 36 and 38, respectively. The lower end of the liners 32 and 34, however, are disposed to seat in wells 66 and 68, respectively, formed by flanges 70 and 72, respectively, which are normally disposed to be filled with the liquid coolant 24. The liquid coolant in the wells 66 and 68 effectively provides a sealed barrier to the spaces 36 and 38 at the bottom of the liners 32 and 34, respectively, and at the same time, provides a free path for the return of the liquid condensate into the sump 22.

As illustrated, the supply 58 of nitrogen gas is usually sufficient to blanket the upper end of the liners 32 and 34 and to fill the spaces 36 and 38, respectively, formed thereby for minimum load operating conditions of the transformer. As the load on the transformer increases, the vapor-gas boundary line is raised due to the increase in pressure of the vapors of the liquid hydrocarbon at a point or level above the upper edge of the liners 32 and 34, whereby the vapors of the liquid coolant are admitted to the spaces 36 and 38 by natural convection, and being heavy, the vapors displace the nitrogen gas contained therein and force it out of the spaces to thereby permit a higher rate of dissipation of heat from the vapors through the side walls 14 and 16 as said side walls are progressively engaged by the vapors admitted to the spaces 36 and 38. In this embodiment, it is to be noted that the spraying device 30 is preferably positioned below the vapor-gas boundary line for minimum operating conditions so that the sprayed liquid coolant will not create turbulence in the supply of the nitrogen gas and the vapor-gas boundary line will, therefore, remain more or less steady for a given operating condition of the transformer. This condition will be more nearly satisfied if application of the cooling liquid by a flow method is used, instead of a spray.

In this embodiment, it will, of course, be appreciated that as the vapors of the liquid coolant condense within the spaces 36 and 38, the condensed coolant will drop to the supply of liquid coolant contained in the wells 66 and 68, respectively, any overflow from such wells being returned to the sump 22 where it can again be pumped and applied to the core 18 and windings 20.

Figures 6, 7, 8, 9:
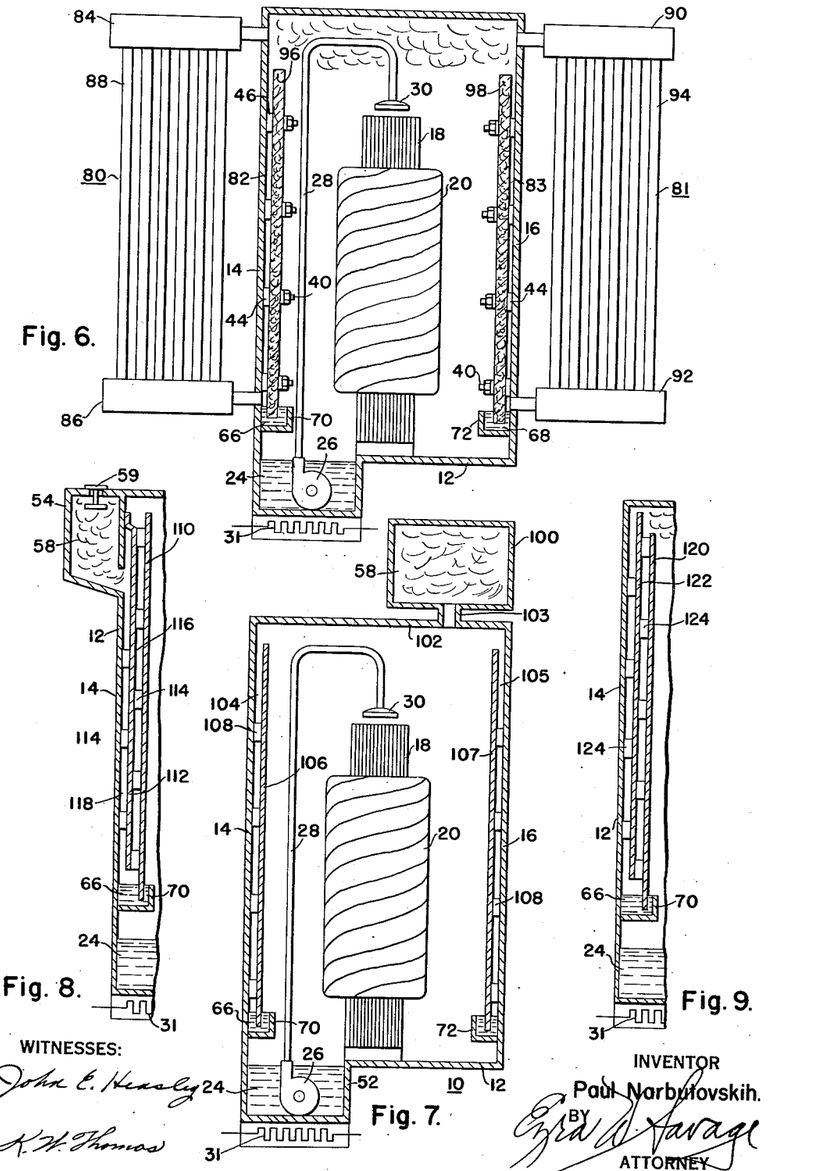
Fig. 6 is a diagrammatic view of a transformer illustrating another embodiment of this invention in which additional cooling surfaces in the form of condensing units are provided.
Fig. 7 is a diagrammatic view of a transformer illustrating another embodiment of this invention in which an additional chamber is provided on the top of the transformer case for receiving the noncondensable gas within the transformer case.
Figs. 8 and 9 are diagrammatic views of transformers illustrating still other embodiments of this invention in which each of the transformers is provided with a double heat insulating wall carried by the side walls of the transformer casing.

Referring to Fig. 6 there is illustrated still another embodiment of the teachings of this invention. Like components of the embodiments of Figs. 3 and 6 have been given the same reference characters. The main distinction between the apparatus of Figs. 3 and 6 is that in the apparatus of Fig. 6 condensing units 80 and 81 are provided in order to function as additional means for condensing the vaporized coolant that enters spaces 82 and 83 corresponding to the spaces 36 and 38, respectively, of Fig. 3. As illustrated, the condensing unit 80 comprises an upper header 84 and a lower header 86 which have disposed therebetween a plurality of tubes 88. In this instance, the condensing unit 81 comprises an upper header 90 and a lower header 92 which have disposed therebetween a plurality of tubes 94.

The spaces 82 and 83 are established by the side wall 14 and a liner 96 and by the side wall 16 and a liner 98, respectively. In order to obtain an optimum of control of the rate of dissipation of heat by the transformer cooling surfaces a liner corresponding to either the liner 96 or the liner 98 may be disposed in spaced relation to each of the remaining side walls of the casing 12. In addition, the liners 96 and 98 should preferably extend throughout the width of the side walls 14 and 16, respectively, and they are sealed on their side edges in a manner similar to the manner that the upper edge of each of the liners 32 and 34 of Fig. 2 is sealed.

In operation the vaporized coolant within the casing 12 will flow into the spaces 82 and 83 in the same manner as described for the embodiment shown in Fig. 3. As hereinbefore mentioned, the condensing units 80 and 81 function as additonal means for condensing this vaporized liquid coolant that enters the spaces 82 and 83. In particular, when operating under maximum load conditions, the vaporized coolant enters the lower headers 86 and 92 of the condensing units 80 and 81, respectively, and flows into the tubes 88 and 94, respectively, where it condenses on the inner surfaces of these tubes. The condensed liquid coolant formed thereby then flows down through the tubes 88 and 94, respectively, through the lower headers 86 and 92, respectively, into the wells 66 and 68, respectively. It is, of course, to be understood that any noncondensable gas 58 that might be mixed with the vaporized liquid coolant as it enters the condensing units 80 and 81 flows up through these condensing units into the upper space formed by the casing 12.

Referring to Fig. 7, there is illustrated another embodiment of this invention in which like components of Figs. 3 and 7 have been given the same reference characters. The main distinction between the apparatus illustrated in Figs. 3 and 7 is that in the apparatus of Fig. 7 an auxiliary chamber 100 is connected to the top 102 of the casing 12 by means of a tubular member 103 so that the chamber 100 is in communication with the casing 12. The purpose of the auxiliary chamber 100 is to provide a space into which the noncondensable gas 58 can be compressed so that the top 102 of the casing 12 can function as a cooling surface for condensing the vaporized coolant that comes in contact therewith. Thus, by providing the auxilary chamber 100 for the noncondensable gas 58, the amount of cooling surfaces for condensing the vaporized coolant within the casing 12 is increased considerably, thereby increasing the capacity of the transformer to withstand higher loads without damage being done thereto.

In operation under normal conditions, the vaporized liquid coolant flows into spaces 104 and 105 corresponding to the spaces 36 and 38 of Fig. 3 and condenses on the side walls 14 and 16, respectively, in a manner similar to the operation described for the apparatus of Fig. 3. However, under maximum load conditions, the vaporized liquid coolant condenses on the side walls 14 and 16 and also on the top portion 102 of the casing 12, the noncondensable gas 58 being compressed into the chamber 100 by the vaporized coolant and confined therewithin under maximum load conditions.

In addition to being provided with the auxiliary chamber 100, the embodiment illustrated in Fig. 7 is also provided with liners 106 and 107 which are made of materials similar to those described with reference to Fig. 2. Since the liners 106 and 107 may be metallic, they can be welded to a plurality of spacer members 108 which in turn are suitably welded to the side walls 14 and 16, respectively. As illustrated, the space 104 is established by the side wall 14 and the liner 106 while the space 105 is established by the side wall 16 and the liner 107. As was the case with the apparatus previously described, a liner, in this embodiment corresponding to either the liner 106 or the liner 107, may be disposed in spaced relation to each of the remaining side walls of the casing 12. In addition, the liners 106 and 107 preferably extend throughout the width of the side walls, and their side edges are sealed in a manner similar to the manner that the upper edge of each of the liners 32 and 34 of Fig. 2 is sealed.

Referring to Figs. 8 and 9, there is illustrated two other embodiments of this invention and in order to simplify the drawings, only the left-hand side of each of these embodiments is illustrated.

Referring to Fig. 8, like components of Figs. 2 and 8 have been given the same reference characters. The main distinction between the apparatus of Figs. 2 and 8 is that in the apparatus of Fig. 8 two metallic liners, an outer liner 110 and an intermediate liner 112, are provided instead of a single liner as illustrated in Fig. 2. The purpose of providing two liners 110 and 112 instead of a single liner is that the two liners provide better heat insulating properties than a single liner. In particular, the temperature difference between the vaporized liquid coolant within the casing 12 and the side wall 14 is greater for a given set of conditions when utilizing the two liners 110 and 112 than it is when utilizing a single liner.

As illustrated, metallic spacer members 114 are disposed between the side wall 14 and the intermediate liner 112 and also between the intermediate liner 112 and the outer liner 110. In this instance, the spacer members 114 are suitably welded to the side wall 14 and the liners 110 and 112. The intermediate liner 112 is also suitably sealed at its upper edge to the casing 12, and the liquid coolant 24 disposed in the well 66 functions to effect a seal between the lower edge of the outer liner 110 and the side wall 14. It is to be noted that due to the high positioning of the double wall intake formed by the liners 110 and 112, a higher rate of and more effective purging of the noncondensable gas 58 into the chambers 54 and 56 is secured than is secured by the apparatus of Fig. 2.

In the embodiment of Fig. 8, the combination of the outer liner 110 and the intermediate liner 112 may be disposed in spaced relation to each of the side walls of the casing 12, and both of these liners preferably extend throughout the width of the side walls of the casing 12, and their side edges are sealed in a manner similar to the manner that the upper edge of each of the liners 32 and 34 of Fig. 2 is sealed. A chamber similar to either the chamber 54 or 56 for receiving the noncondensable gas 58 is associated with each of the combined liners 110 and 112. However, as hereinafter described, the chamber may be such as to serve more than one of the combined liners 110 and 112 and the spaces 116 and 118 formed thereby.

The operation of the apparatus of Fig. 8 is substantially the same as the operation of the apparatus shown in Fig. 2, the only distinction being that in the apparatus of Fig. 8 the vaporized liquid coolant flows down through a space 116 between the liners 110 and 112 and up through a space 118 established by the side wall 14 and the intermediate liner 112 where the vaporized coolant condenses on the side wall 14.

Referring to Fig. 9, there is illustrated still another embodiment of this invention in which like components of Figs. 3 and 9 have been given the same reference characters. The main distinction between the apparatus of Figs. 3 and 9 is that in the apparatus of Fig. 9 a double wall liner similar to that illustrated in Fig. 8 is provided. As illustrated, the double wall liner comprises an outer liner 120 and an intermediate liner 122. In this instance spacer members 124 are suitably disposed between the side wall 14 and the intermediate liner 122 and between the liners 122 and 120 and they are suitably welded to these members. As was the case with the apparatus of Fig. 8, the double wall liners formed by the liners 120 and 122 provide better heat insulatnig properties than a single liner as, for instance, illustrated in the apparatus of Figs. 2, 3, 6 and 7.

The combination of the outer liner 120 and the intermediate liner 122 is preferably disposed in spaced relation to each of the side walls of the casing 12. The liners 120 and 122 preferably extend throughout the width of the side wall 14, and their side edges are sealed in a manner similar to the manner that the upper edge of each of the liners 32 and 34 of Fig. 2 is sealed. As illustrated, the liquid coolant 24 disposed in the well 66 functions as a seal between the lower edge of the outer liner 120 and the side wall 14.

In the providing of the chambers for the noncondensable gas, such as the chambers 54 and 56 in the modifications illustrated in Figs. 2 and 8, they are shown as partitioned off from the main body of the casing 12 and in a specific location. It is to be understood that these gas-receiving chambers for the noncondensable gas may be disposed in any location with respect to the casing 12 to which the noncondensable gas will flow when subjected to the pressure of the heavier vapors in the operation of the transformer. Further, these chambers for the noncondensable gas may be partitioned off from the main body of the casing by the proper arrangement of the liners or by independent partitions or shields (not shown) but that may be introduced by any one skilled in the transformer art. There may be a number of independent chambers (one for each side wall of the casing 12) or the chamber may extend around the tank as long as the noncondensable gas may flow into it from the main casing 12 to thus serve the space formed by one or more liners.

It is to be understood that the liners in each of the foregoing embodiments may be disposed in spaced relation to one or more of the side walls of the casing 12.

In the foregoing description and drawings, all of the modifications have been described and shown as having liners applied to a square or rectangular transformer casing 12. It is to be understood that in applying these liners they may be applied to a portion of a rectangular tank or casing or to a portion or all of the side wall of a cylindrical transformer tank or casing.

This invention makes possible the provision of a totally enclosed system which will maintain a controlled range of pressure and temperature within the casing 12. The apparatus utilized makes possible the exclusion of the major part of the casing wall and the externally mounted coolers from effecting heat dissipation at the low loads and, therefore, will assist in maintaining the vapor pressure within the casing 12 at a value which will insure adequate insulating properties of the vapor even at low loads and low ambients.

While this invention has been described with particular reference to the transformers, it will be understood that the invention may be applied to other types of electrical apparatus, such as, for example, switchgear, generators and the like, which utilize casing walls as part of their structure. The spraying of the liquid coolant to the electrical device may be accomplished in a number of different ways in order to obtain coverage of the electrical apparatus or direct contact of the liquid coolant with the electrical apparatus whereby the vapors of the liquid coolant may be efficiently evolved to efficiently extract or dissipate the heat from the electrical apparatus.

I claim as my invention:

1. In sealed electrical apparatus in which the operation of the electrical apparatus results in the production of heat, the combination comprising, a sealed casing having a side wall, means for dissipating the heat from the electrical apparatus and for electrically insulating the electrical apparatus comprising a supply of vaporizable fluorinated organic liquid coolant and means for applying the fluorinated organic liquid coolant to the electrical apparatus to cool the electrical apparatus by evaporation of the coolant to a condensable vapor, the vapor constituting electrical insulation for the electrical apparatus, a relatively noncondensable gas disposed in the casing to provide a compressible cushion for the condensable vapor, said vapor being heavier than said relatively noncondensable gas, and a liner disposed in spaced relation to the side wall to provide a space therebetween, said liner cooperating with the space between said liner and the side wall of the casing to provide a thermal barrier to any direct heat flow from the condensable vapor to said side wall when the pressure of the condensable vapor is below a predetermined value, an opening between one end of the said liner and said side wall of the casing and leading to said space to receive the condensable vapor from the casing to thus provide an effective heat flow from the condensable vapor to said side wall when the pressure of the condensable vapor within the casing increases above the predetermined value.

2. In sealed electrical apparatus in which the operation of the electrical apparatus results in the production of heat, the combination comprising, a sealed casing having side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus to cool the electrical apparatus by evaporation of the coolant to a condensable vapor, the vapor constituting electrical insulation for the electrical apparatus and the pressure of the vapor being dependent upon the temperature in the casing, a relatively noncondensable gas disposed in the casing to provide a compressible cushion for the condensable vapor, said vapor being heavier than said relatively noncondensable gas, and liners within the casing each disposed in spaced relation to one of said side walls thereof to provide a space between each of the liners and its associated side wall, said liners cooperating with the spaces between said liners and the associated side walls of the casing to provide a thermal barrier to any direct heat flow from the condensable vapor to said side walls when the pressure of the condensable vapor is below a predetermined value, each liner being of a size to cover a major part of its associated side wall, an opening between one end of each of the liners and its associated side wall of the casing and leading to the space therebetween to receive the condensable vapor from the casing to thus provide an effective heat flow from the condensable vapor to said side walls when the pressure of the vapors within the casing increases above the predetermined value, the side walls of the casing cooperating to dissipate heat from the condensable vapor as the condensable vapor flows into the spaces between the liners and their associated side walls.

3. In sealed electrical apparatus in which the operation of the electrical apparatus results in the production of heat, the combination comprising, a sealed casing having side walls, an auxiliary chamber carried by the sealed casing, means for dissipating the heat from the electrical apparatus and for electrically insulating the electrical apparatus comprising a supply of vaporizable fluorinated organic liquid coolant and means for applying the fluorinated organic liquid coolant to the electrical apparatus in the form of a film to cool the electrical apparatus by evaporation of the coolant to a condensable vapor, the vapor constituting electrical insulation for the electrical apparatus and the pressure of the vapor being dependent upon the temperature in the casing, a liner within the casing disposed in spaced relation to one of said side walls thereof to provide a space therebetween, said liner cooperating with the space between said liner and said one of said side walls to provide a thermal barrier to any direct heat flow from the condensable vapor to said one of said side walls when the pressure of the condensable vapor is below a predetermined value, the space having one end in communication with the auxiliary chamber and the other end open within the casing for receiving the condensable vapor therefrom to thus provide an effective heat flow from the condensable vapor to said one of said side walls when the pressure of the condensable vapor increases above the predetermined value, and a relatively noncondensable gas disposed within the auxiliary chamber and the space, said noncondensable gas being lighter than said condensable vapor, the noncondensable gas cooperating with the condensable vapor to prevent the flow of the condensable vapor into the space until the pressure of the condensable vapor increases above the predetermined value.

4. In sealed electrical apparatus in which the operation of the electrical apparatus results in the production of heat, the combination comprising, a sealed casing having side walls, an auxiliary chamber carried by the sealed casing, means for dissipating the heat from the electrical apparatus and for electrically insulating the electrical apparatus comprising a supply of vaporizable fluorinated organic liquid coolant and means for applying the fluorinated organic liquid coolant to the electrical apparatus in the form of a film to cool the electrical apparatus by evaporation of the coolant to a condensable vapor, the vapor constituting electrical insulation for the electrical apparatus and the pressure of the vapor being dependent upon the temperature in the casing, a liner of insulating material within the casing disposed in spaced relation to one of said side walls thereof to provide a space therebetween, said liner cooperating with the space between said liner and said one of said side walls to provide a thermal barrier to any direct heat flow from the condensable vapor to said one of said side walls when the pressure of the condensable vapor is below a predetermined value, the space being open to the casing at the lower end of the liner and being closed to the casing at the upper end of the liner to thus provide an effective heat flow from the condensable vapor to said one of said side walls when the pressure of the condensable vapor increases above the predetermined value, the auxiliary chamber being disposed in communication with the space adjacent the upper end of the liner, and a relatively noncondensable gas disposed within the auxiliary chamber and the space, said noncondensable gas being lighter than said condensable vapor, the noncondensable gas cooperating with the condensable vapor to prevent the flow of the condensable vapor into the space until the pressure of the condensable vapor within the casing increases above the predetermined value.

5. In sealed electrical apparatus in which the operation of the electrical apparatus results in the production of heat, the combination comprising, a sealed casing having a pair of opposed side walls, an auxiliary chamber disposed along the upper edge of each of the side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus in the form of a film to cool the electrical apparatus by evaporation of the coolant to a condensable vapor, the vapor constituting electrical insulation for the electrical apparatus and the pressure of the vapor being dependent upon the temperature in the casing, a metallic liner for each of the side walls disposed within the casing in spaced relation to the associated side wall to provide a space therebetween, said liners cooperating with the spaces between said liners and the associated side walls of the casing to provide a thermal barrier to any direct heat flow from the condensable vapor to said side walls when the pressure of the condensable vapor is below a predetermined value, each of the spaces being open to the casing at the lower end of the liner and being closed to the casing at the upper end of the liner to thus provide an effective heat flow from the condensable vapor to said side walls when the pressure of the vapors within the casing increases above the predetermined value, each of the spaces being associated with one of the auxiliary chambers and in communication therewith, a relatively noncondensable gas disposed within each of the auxiliary chambers and the space associated therewith, said noncondensable gas being lighter than said condensable vapor, the noncondensable gas cooperating with the condensable vapor to prevent the flow of the condensable vapor into the spaces until the pressure of the condensable vapor within the casing increases above the predetermined value, and a pressure responsive valve disposed in each of the auxiliary chambers for venting off the excess noncondensable gas in the auxiliary chambers when first starting up the apparatus and for preventing the escape of the noncondensable gas from the auxiliary chambers once operating conditions for the apparatus have been reached.

6. In sealed electrical apparatus in which the operation of the electrical apparatus results in the production of heat, the combination comprising, a sealed casing having side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus to cool the electrical apparatus by evaporation of the coolant to a condensable vapor, the vapor constituting electrical insulation for the electrical apparatus and the pressure of the vapor being dependent upon the temperature in the casing, a liner within the casing disposed in spaced relation to one of said side walls thereof to provide a space therebetween, said liner cooperating with the space between said liner and said one of said side walls to provide a thermal barrier to any direct heat flow from the condensable vapor to said one of said side walls when the pressure of the condensable vapor is below a predetermined value, a well at the bottom edge of the liner disposed to retain a supply of the liquid coolant to seal the bottom edge of the space, the space being open to the casing at the upper edge of the liner and leading to said space to receive the condensable vapor from the casing to thus provide an effective heat flow from the condensable vapor to said one of said side walls when the pressure of the condensable vapor within the casing increases above the predetermined value, and a relatively noncondensable gas disposed within the casing to provide a compressible cushion at the upper end of the casing for the condensable vapor, said noncondensable gas being lighter than said condensable vapor, the noncondensable gas being present in an amount sufficient to blanket the upper end of the liner and enter the space when the pressure of the condensable vapor is below the predetermined value, whereby the noncondensable gas in the space and the liner cooperate to retard loss of heat from the condensable vapor through said one of said side walls, the noncondensable gas being compressible as the pressure of the condensable vapor increases above said predetermined value to permit the flow of the condensable vapor into the space to engage said one of said side walls and effectively dissipate the heat from the vapor.

7. In sealed electrical apparatus in which the operation of the electrical apparatus results in the production of heat, the combination comprising, a sealed casing having side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus to cool the electrical apparatus by evaporation of the coolant to a condensable vapor, the vapor constituting electrical insulation for the electrical apparatus and the pressure of the vapor being dependent upon the temperature in the casing, a liner within the casing disposed in spaced relation to one of said side walls thereof to provide a space therebetween, said liner cooperating with the space between said liner and said one of said side walls to provide a thermal barrier to any direct heat flow from the condensable vapor to said one of said side walls when the pressure of the condensable vapor is below a predetermined value, a well at the bottom edge of the liner disposed to retain a supply of the liquid coolant to seal the bottom edge of the space, the space being open to the casing at the upper edge of the liner to thus provide an effective heat flow from the condensable vapor to said one of said side walls when the pressure of the condensable vapor increases above the predetermined value, a relatively noncondensable gas disposed within the casing to provide a compressible cushion at the upper end of the casing for the condensable vapor, said noncondensable gas being lighter than said condensable vapor, the noncondensable gas being present in an amount sufficient to blanket the upper end of the liner and enter the space when the pressure of the condensable vapor is below the predetermined value, whereby the noncondensable gas in the space and the liner cooperate to retard loss of heat from the condensable vapor through said one of said side walls, the noncondensable gas being compressible as the pressure of the condensable vapor increases above said predetermined value to permit the flow of the condensable vapor into the space to engage said one of said side walls and effectively dissipate the heat from the vapor, and a condensing unit comprising an upper end and a lower header, the lower header being in communication with the lower portion of the space and the upper header being in communication with the noncondensable gas in the upper portion of the casing, whereby under heavy load conditions some of the vapor flows down through the space and into the condensing unit where it is condensed.

8. In sealed electrical apparatus in which the operation of the electrical apparatus results in the production of heat, the combination comprising, a sealed casing having side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus by evaporation of the coolant to a condensable vapor, the vapor constituting electrical insulation for the electrical apparatus and the pressure of the vapor being dependent upon the temperature in the casing, a liner within the casing disposed in spaced relation to one of said side walls thereof to provide a space therebetween, said liner cooperating with the space between said liner and said one of said side walls to provide a thermal barrier to any direct heat flow from the condensable vapor to said one of said side walls when the pressure of the condensable vapor is below a predetermined value, a well at the bottom edge of the liner disposed to retain a supply of the liquid coolant to seal the bottom edge of the space, the space being opened to the casing at the upper edge of the liner to thus provide an effective heat flow from the condensable vapor to said one of said side walls when the pressure of the condensable vapor increases above the predetermined value, an auxiliary sealed chamber connected to the top of the sealed casing and in communication with the sealed casing, a relatively noncondensable gas disposed within the sealed casing and the auxiliary chamber to provide a compressible cushion at the upper end of the casing for the condensable vapor, said noncondensable gas being lighter than the condensable vapor, the noncondensable gas being present in an amount sufficient to blanket the upper end of the liner and enter the space formed by the liner when the pressure of the condensable vapor is below the predetermined value, the noncondensable gas in the space and the liner cooperating to retard loss of heat from the condensable vapor through said one of said side walls, the noncondensable gas being compressible as the pressure of the condensable vapor increases above said predetermined value to permit the flow of the condensable vapor into the space to engage said one of said side walls and effectively dissipate the heat from the vapor and whereby when the pressure of the condensable vapor is of relatively large magnitude all of the noncondensable gas will be compressed into the auxiliary chamber and the inner top surface of the sealed casing is exposed to the condensable vapor upon which surface the condensable vapor condenses.

9. In sealed electrical apparatus in which the operation of the electrical apparatus results in the production of heat, the combination comprising, a sealed casing having side walls, an auxiliary chamber carried by the upper portion of the sealed casing, means for dissipating the heat from the electrical apparatus and for electrically insulating the electrical apparatus comprising a supply of vaporizable fluorinated organic liquid coolant and means for applying the fluorinated organic liquid coolant to the electrical apparatus in the form of a film to cool to the electrical apparatus by evaporation of the coolant to a condensable vapor, the vapor constituting electrical insulation for the electrical apparatus and the pressure of the vapor being dependent upon the temperature in the casing, an outer liner within the casing disposed in spaced relation to one of said side walls, a well at the bottom edge of the outer liner disposed to retain a supply of the liquid coolant to function as a seal between the bottom edge of the outer liner and said one of said side walls, an intermediate liner disposed between said one of said side walls and the outer liner and in spaced relation to each of them to provide a space between said one of said side walls and the intermediate liner, the space having one end in communication with the auxiliary chamber and the other end open for receiving the condensable vapor from the other space formed by the intermediate liner and the outer liner, and a relatively noncondensable gas disposed within the auxiliary chamber and the said space formed by said one of said side walls and the intermediate liner, the noncondensable gas cooperating with the condensable vapor to prevent the flow of the condensable vapor into said space formed by said one of said side walls and the intermediate liner until the pressure of the condensable vapor within the sealed casing increases above a predetermined value, the intermediate liner and the outer liner both retarding the dissipation of the heat from the condensable vapor through said one of said side walls until the condensable vapor flows down through said space formed by the intermediate liner and the outer liner into the said space formed by said one of said side walls and the intermediate liner to engage said one of said side walls and condense thereon.

10. In sealed electrical apparatus in which the operation of the electrical apparatus results in the production of heat, the combination comprising, a sealed casing having side walls, means for dissipating the heat from the electrical apparatus and for electrically insulating the electrical apparatus comprising a supply of vaporizable fluorinated organic liquid coolant and means for applying the fluorinated organic liquid coolant to the electrical apparatus to cool the electrical apparatus by evaporation of the coolant to a condensable vapor, the vapor constituting electrical insulation for the electrical apparatus and the pressure of the vapor being dependent upon the temperature in the casing, an outer liner within the casing disposed in spaced relation to one of said side walls thereof, a well at the bottom edge of the outer liner disposed to retain a supply of the liquid coolant to function as a seal between the bottom edge of the outer liner and said one of said side walls of the casing, an intermediate liner disposed between said one of said side walls of the casing and the outer liner and in spaced relation to each of them, the space formed by said one of said side walls and the intermediate liner being open at the bottom thereof to the space formed by the intermediate liner and the outer liner, both the spaces formed by said one of said side walls and the intermediate liner and by the intermediate and the outer liner being open at the top thereof to the sealed casing at the upper edge of the two liners, the upper edge of the intermediate liner being disposed in closer proximity to the top of the sealed casing than the upper edge of the outer liner, and a relatively noncondensable gas disposed within the sealed casing to provide a compressible cushion at the upper end of the casing for the condensable vapor, said noncondensable gas being lighter than said condensable vapor, the noncondensable gas being present in an amount sufficient to blanket the upper ends of the outer and intermediate liner, whereby the noncondensable gas and the intermediate and outer liner cooperate to retard loss of heat from the condensable vapor through said one of said side walls of the casing, the noncondensable gas being compressible as the pressure of the condensable vapor increases to permit the flow of the condensable vapor down through the space formed by the outer and intermediate liner and into the space formed by said one of said side walls of the casing and the intermediate liner to engage said one of said side walls of the casing and effectively dissipate the heat from the condensable vapor.

References Cited in the file of this patent

UNITED STATES PATENTS

| | | |
|---|---|---|
| 2,083,611 | Marshall | June 15, 1937 |
| 2,142,828 | Smith | Jan. 3, 1939 |
| 2,147,481 | Beetlestone | Feb. 14, 1939 |
| 2,221,720 | Prince | Nov. 12, 1940 |
| 2,341,058 | Paluev | Feb. 8, 1944 |
| 2,561,738 | Hill | July 24, 1951 |